United States Patent [19]

Rion et al.

[11] 4,379,539
[45] Apr. 12, 1983

[54] POWER SEAT ADJUSTER

[75] Inventors: Claude Rion; Winfried Ruckheim, both of Ingolstadt, Fed. Rep. of Germany

[73] Assignee: Audi Nsu Auto Union Aktiengesellschaft, Neckarsulm, Fed. Rep. of Germany

[21] Appl. No.: 217,783

[22] Filed: Dec. 18, 1980

[30] Foreign Application Priority Data

Dec. 22, 1979 [DE] Fed. Rep. of Germany ....... 2952030

[51] Int. Cl.³ .............................................. A47G 25/00
[52] U.S. Cl. .................................. 248/371; 248/422; 248/419
[58] Field of Search ........................ 248/371, 393–398, 248/419, 422

[56] References Cited

U.S. PATENT DOCUMENTS

| 881,312 | 3/1908 | Field | 248/422 |
| 1,237,999 | 8/1917 | Gammeter et al. | 248/422 |
| 2,174,636 | 10/1939 | McGregor | 248/394 |
| 2,614,610 | 10/1952 | Camisa et al. | 248/422 |
| 2,868,271 | 1/1959 | Pickles | 248/419 |
| 3,183,314 | 5/1965 | Pickles | 248/394 |
| 4,257,569 | 3/1981 | Budinski | 248/394 |

FOREIGN PATENT DOCUMENTS

| 9923 | of 1885 | United Kingdom | 248/422 |
| 12425 | of 1888 | United Kingdom | 248/422 |

Primary Examiner—Francis K. Zugel
Assistant Examiner—Michael F. Trettel
Attorney, Agent, or Firm—Karl F. Ross; Herbert Dubno

[57] ABSTRACT

A motor-vehicle seat adjuster has a sun gear with which at least one planet gear is in continuous mesh. A link has an outer end carrying this planet gear and an inner end pivoted at the axis of the sun gear to allow pivoting of the planet gear between two angularly offset positions in each of which is meshes with a respective output gear. A control element is provided for displacing this gear between these two positions and the sun gear is rotated from an electrical motor. When the planet gear is in mesh with one of the output gears it displaces the seat in one direction and when in mesh with the other output gear it displaces it in another different direction.

17 Claims, 6 Drawing Figures

POWER SEAT ADJUSTER

FIELD OF THE INVENTION

The present invention relates to a positioning apparatus. More particularly this invention concerns a power seat adjuster used for positioning the seat of an automative vehicle.

BACKGROUND OF THE INVENTION

A power seat-adjusting mechanism is normally provided both to vertically displace the front driver's seat of an automotive vehicle as well as to displace it in the direction of travel so as to accommodate drivers of different height. In addition from a comfort point of view it is frequently considered desirable to be able to change the front-to-back inclination of the seat.

These functions were originally done by the expedient of providing several small motors working through respective gear drives to carry out the various functions. Obviously such an arrangement is relatively expensive and quite complex. Furthermore such an arrangement takes up a great deal of space under the seat and does not lend itself to inexpensive serial production.

It is therefore been suggested, as in U.S. Pat. No. 3,079,118 of J. Pickles, to provide a single drive motor which can be connected via various solenoid-operated clutches to several different gear trains which carry out the various functions. This type of arrangement does, indeed, represent a substantial saving in expensive mechanism. Nonetheless it still is rather cumbersome and failure prone.

OBJECTS OF THE INVENTION

It is therefore an object of the present invention to provide an improved positioning apparatus which is particularly suitable for use as a seat adjuster for an automotive vehicle.

Another object is to provide such an apparatus which is extremely simple in construction so that it can be built at relatively low cost, yet which is capable of performing several different adjustment functions.

Further object is to provide such a seat adjuster which can be made extremely compact.

SUMMARY OF THE INVENTION

These objects are attained according to the instant invention in an adjuster having a sun gear centered on and rotatable about a sun-gear axis relative to the vehicle frame. At least one planet gear meshes with this sun gear and is supported for displacement angularly of the axis while in mesh with the sun gear between a pair of angularly offset end positions. Manually operable control means is connected to this planet gear for displacing it between these end positions. In the one end position it meshes with a first output gear and in the other end position it meshes with another output gear. Drive means is provided for rotating the sun gear and rotating the planet gear that meshes with it. The output gears are connected to the seat for displacement of the seat in a first direction when the first output gear is driven by the sun gear through the planet gear in the one position thereof and for displacement in a second direction different from the first direction when the second output gear is driven by the sun gear through the planet gear in the other position thereof.

With this system, therefore, it is possible by means of a very simple basic structure to carry out several different functions. Normally the planet gear is carried on the outer end of a link whose inner end is pivoted at the sun-gear axis. Thus the planet gear is always in mesh with the sun gear. A simple control element which can be manually operated with minimal effort can pivot the link to move the planet gear from mesh with one of the output gears to mesh with the other output gear. Normally this same handle coacts with switches that operate the small electric motor that drives the sun gear. It is of course also possible within the scope of this invention to mount the inner end of the link about a point eccentric to the sun-gear axis so that on moving from one end position to the other it is displaced out of mesh with the sun gear.

According to this invention a cam may be used to displace the planet gear between its end positions. This cam engages the link, normally by means of a cam slot into which a pin carried on the link fits. Tipping of the cam moves the pin in the slot to displace the planet gear between its end positions.

It is particular advantageous when the control wheel is pivoted so that its path of motion forms a right angle with the path of motion of the respective pivot arm in the region of the periphery of the sun wheel. Such an arrangement ensures, in particular when the sun gear is rotating, that the drive is self locking and no additional locking devices are required. Obviously when the cam, for instance, is displaced in such a direction between its operative positions the forces effective on it during operation of the seat adjuster will not maladjust it, moving it from its one set position to another.

According to further features of this invention the seat is normally supported on four spindles each fitted at its lower end into a bearing and at its upper end into a nut pivotal about a horizontal axis perpendicular to the normal direction of travel and held on the seat. All of these bearings at the bottom of these spindles are in turn supported on the motor-vehicle frame on a slide that can be moved forwardly and backwardly by a rack which constitutes one of the output gears. Such a system can ideally be set up for front-to-back tipping of the seat also. This is achieved by providing three output gears, two planet gears, two links, and four positions for the control element. One of the output gears is constituted by the rack for forward and backward displacement of the seat, another output gear is carried directly on one of the front spindles which is connected for joint rotation by a belt or like the other front spindle, and the other output gear is carried on one of the rear spindles which is also connected for joint rotation with the other rear spindle. In one position of the control element which is connected via cam slots as described above to both of the links, one of the planet gears is brought into mesh with the rack and the other planet gear is held out of mesh with any output gears. In another position the two planet gears are each brought into mesh with the output gears of the front and rear spindles for joint raising and lowering of the entire seat. In each of the last two positions one of the planet gears is brought into engagement with the respective one of the output gears for raising or lowering of only the front or rear of the seat. Thus this relatively complex type of adjustment can be carried out with an extremely simple arrangement all operated by means of a single control element.

This control element is in fact also part of the switching circuit and is set up so that it can only switch on the motor when it is in one of the positions, and that when it is in any of these positions lifting it up, for example, will operate the motor in a direction to bring the seat forward or raise it, and pushing it down operates the motor in the opposite direction to move the seat back or lower it. Thus an extremely logical operation of the adjuster according to this invention is achieved.

This effect can also be achieved by providing four planet gears, and an output gear on each of the spindles so that overall there are five output gears. Each of the links therefore will carry two planet gears. Only one of the planet gears will be able to move into engagement with the rack for horizontal forward and backward displacement of the seat in the vehicle. The others will merely be able to move into and out of engagement with the respective output gears on the respective seat spindles. Such an arrangement has the considerable advantage of neatly balancing forces within the system and of being an extremely flat structure. The gears can be formed of a durable synthetic resin, since the forces they must exert are relatively small. In addition some play is left in these gears, adding up to at least the angular pitch of one tooth, so as to prevent clashing when a planet gear is moved from engagement with one output gear to engagement with another.

SPECIFIC DESCRIPTION

Figure 1:
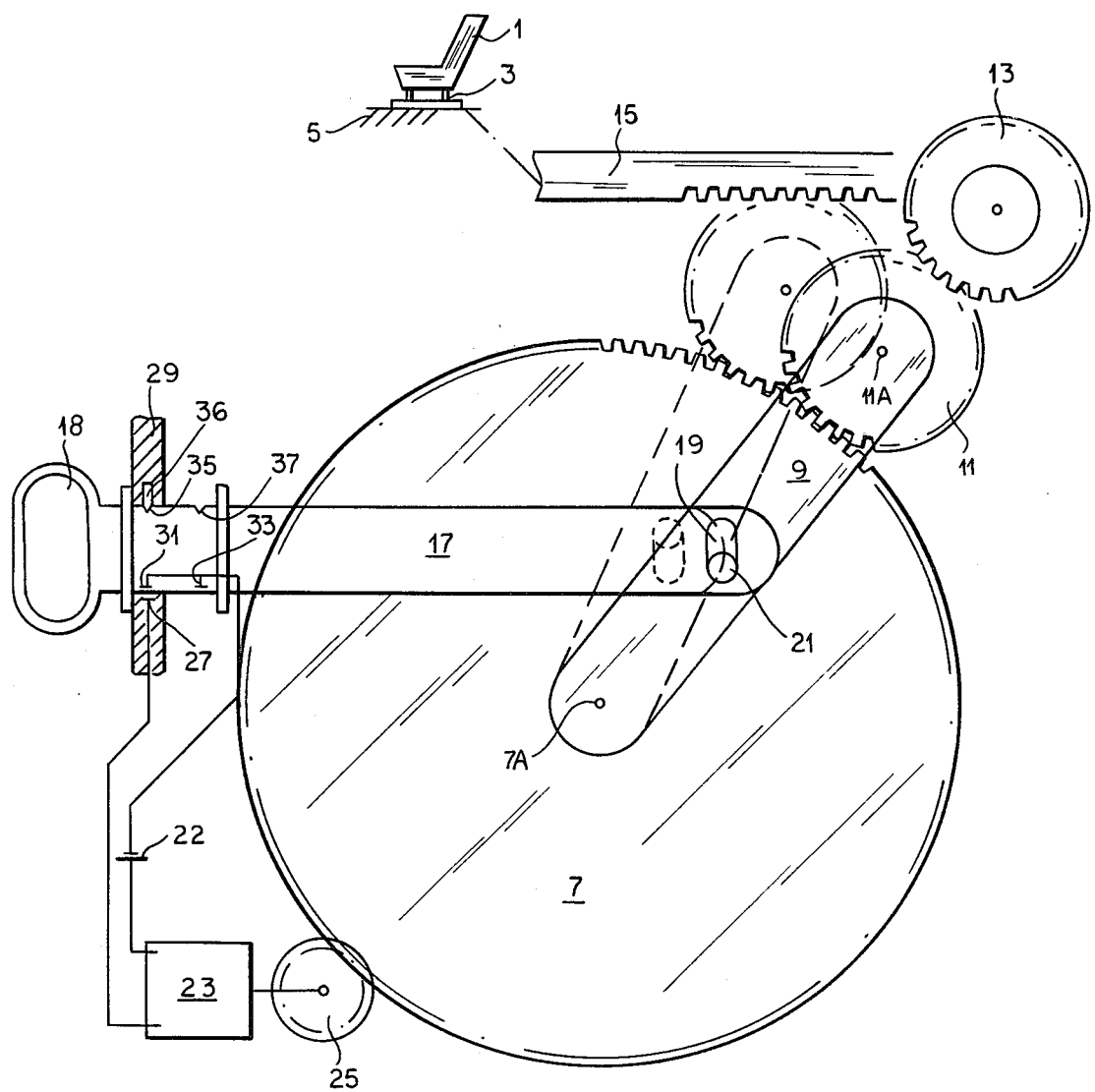
FIG. 1 is a partly schematic top view of a basic seat adjuster according to the instant invention.

As shown in FIG. 1 an automotive-vehicle seat 1 is supported on four threaded spindles 3 and in turn supported on a rack 15 displaceable horizontally in the vehicle direction of travel relative to the frame 5 of the vehicle. This seat 1, at a minimum, must be able to move vertically as well as horizontally in the direction of travel.

These motions are achieved according to the instant invention as shown in FIG. 1 in a system having as its central driving member a sun gear 7 rotatable about an axis 7A about which is also provided a link or arm 9 carrying at an axis 11A a planet gear 11 that remains always in mesh with the external teeth of the sun gear 7. This planet gear 11 is displaceable angularly between the solid-line position in mesh with an output gear 13 and the dot-dash position in mesh with the rack 15. The output gear 13 is connected to the spindles 3 so that when it rotates it can screw the seat 1 up or down depending on rotation direction of the gear 13. The rack 15 carries the seat 1 so that when it is driven by the gear 11 it can displace the seat 1 forwardly or backwardly relative to the frame 5.

The link 9 is moved between its end positions by a control element or arm 17 formed at its inner end with a transverse slot 19 into which projects a pin 21 on the link 9. Longitudinal displacement of this control arm 17 is effected by means of an externally excessible handle 18 slidable in a support 29 defining a pair of positions defined by notches 35 and 37 and in which is engageable a spring-loaded ball 36.

An electric motor 23 has an output gear 25 in continuous mesh with the main sun gear 7. Contacts 31 and 33 on the control element 17 cooperate with the contact 27 on the support 29 so that the motor 23 can only be energized when the control arm 17 is in one of its positively defined positions, which respectively correspond to the end positions of the planet gear 11.

All of the gears are formed of a durable synthethic resin such as a polyamide or acrylonitrilebutadienestyrene. Their external teeth fit together with some play, at least equal to their pitch, so that clashing of gears together as the gear 11 moves between the gears 13 and 15 is eliminated. The transmission ratio from the motor 23 through the large sun gear 7 is relatively large so that this motor 23 can be an extremely small electric motor easily powered by the motor-vehicle battery 22.

FIGS. 2–4 and 4A show a more complete system according to the instant invention. Here a central sun gear 39 is pivotal about an axis 39a about which is also pivotal a pair of separate links 51 and 43 carrying respective planet gears 45 and 47. A cam-type control element pivoted about an axis 49a parallel to but offset from the axis 39a is formed with a pair of nonstraight cam slots 51 and 53 in which are respectively engaged pins 55 and 57 fixed on the links 41 and 43. The planet gears 45 can engage respective output gears 59 and 61 connected via respective toothed belts 63 and 65 to further toothed pulleys 67 and 69. The gears 59 and 61 and pulleys 67 and 69 form a rectangular array and are connected to four corner support spindles 71 for the motor-vehicle seat. Each of these spindles 71 is seated at its lower end in an appropriate bearing and is threaded at its upper end into the structure of seat. The bearings at the lower ends of the spindles 71 are supported on the rack 97 that allows horizontal displacement of the seat in the direction of travel indicated in FIG. 3 by arrow 93.

A control element 73 pivotal about an axis 73a that is parallel to but offset from the axis 39a diametrically opposite the axis 49A has teeth 75 meshing with teeth 77 formed in the edge of the cam 49. This control element 73 has at is outer end a handle 79 and is displaceable in a slot 81 through four notch-out positions 83, 85, 87 and 89.

A symbol 91 indicated that when the handle 79 is in position 83 the gears mesh so that the front half of the seat only is raised or lowered. In position 85 the entire seat is raised and lowered. In position 87 the back of the seat is raised or lowered. Finally in position 89 the entire seat is moved forwardly or backwardly in the direction 93.

Figure 2:
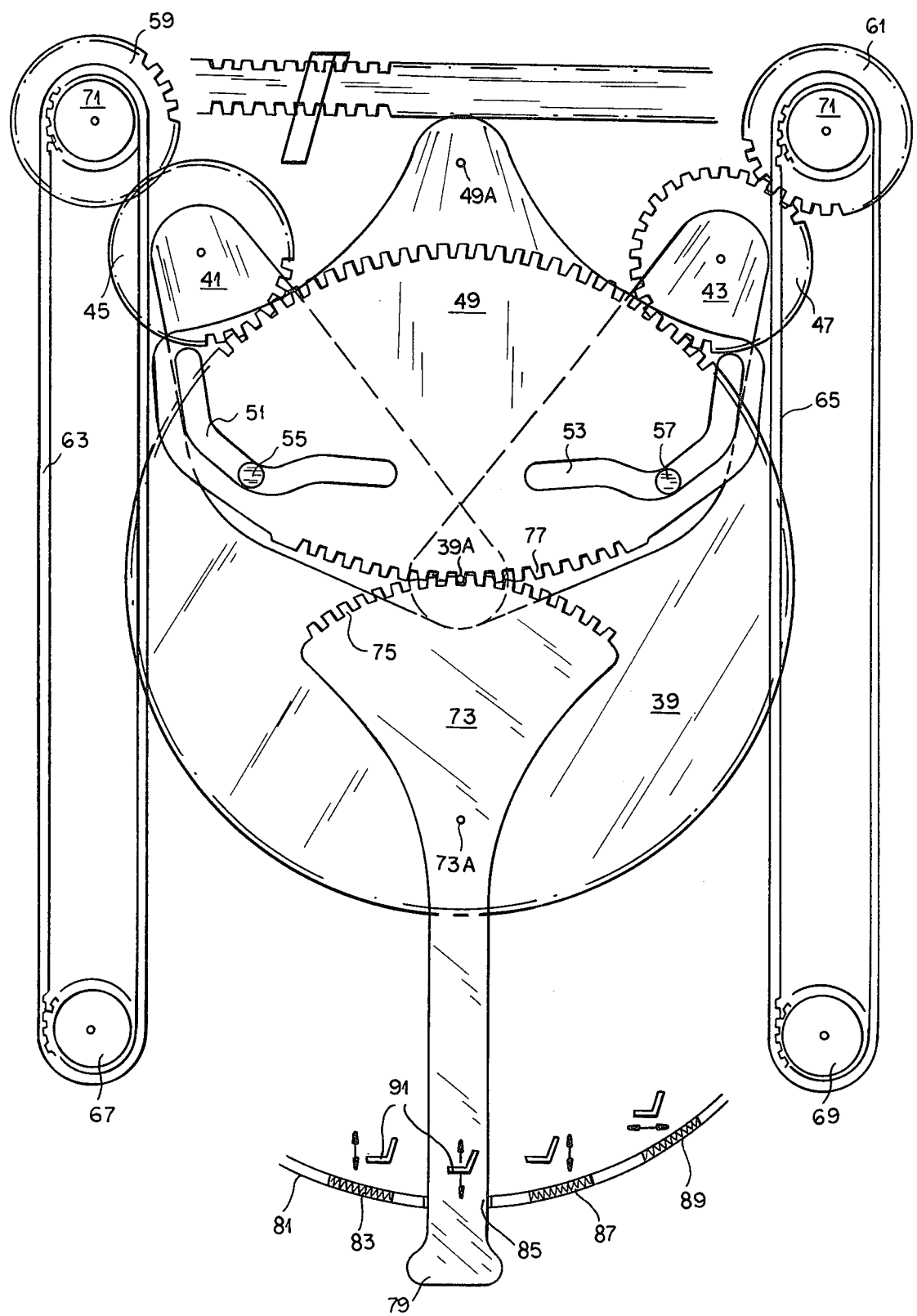
FIG. 2 is a partly schematic top view of another seat adjuster in accordance with this invention.

FIG. 2 shows the handle 79 in position 85 for raising and lowering the entire seat. In this position the pins 55 and 57 both lie generally centrally in the cam slots 51 and 53 so that the respective links 41 and 43 hold the respective planet gears 45 and 47 in mesh with the two spindles output gears 59 and 61. Thus a motor like the motor 23 of FIG. 1 driving the sun gear 39 will rotate both of the gears 59 and 61 so that all four of the spindles 71 supporting the corners of the motor-vehicle seat will be jointly rotated in the same direction.

Figure 3:
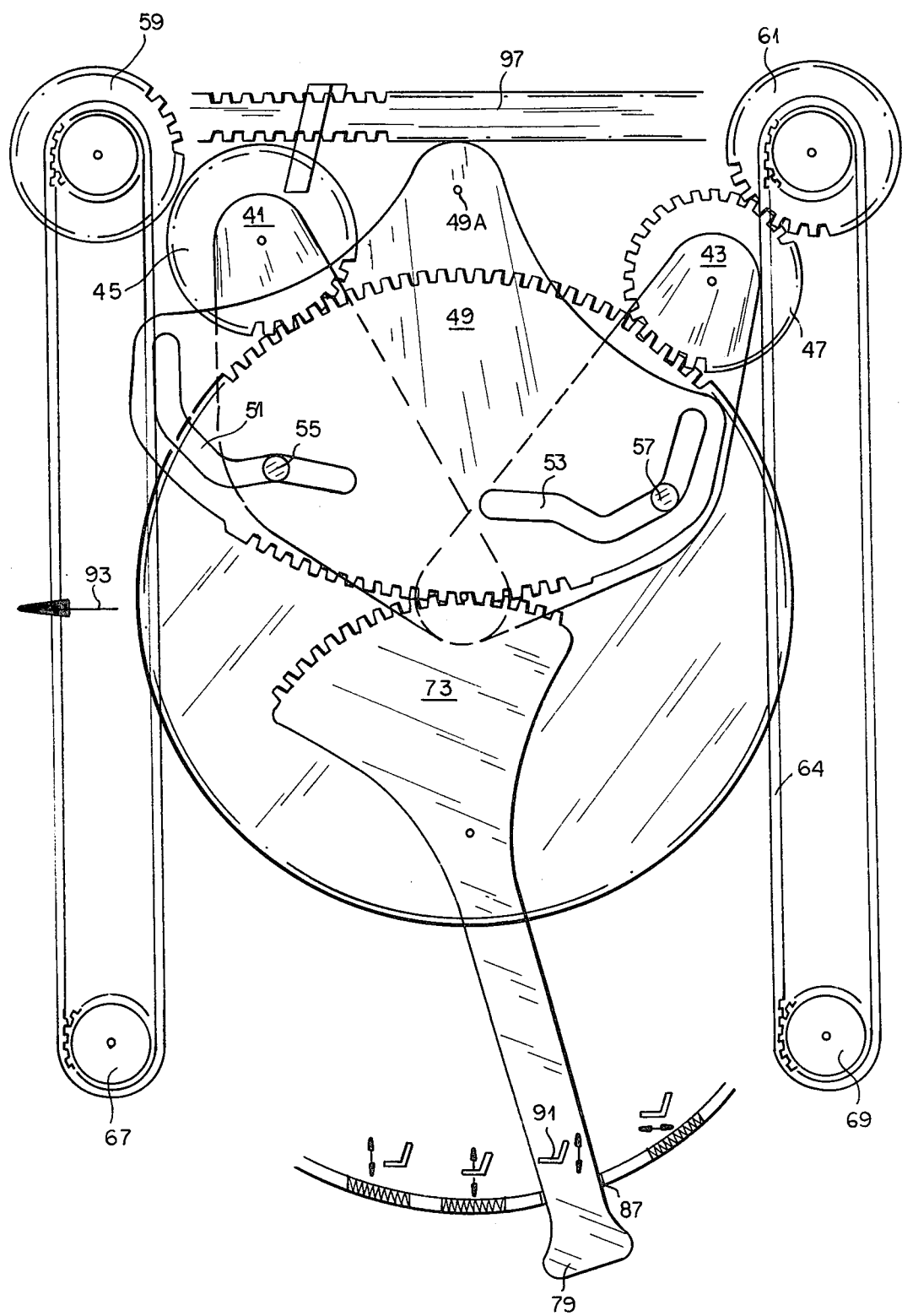
FIGS. 3 and 4 are top views of the system of FIG. 2 shown in a different operating position.

In FIG. 3 the handle 79 is shown in position 87 for raising the seat back alone. Such a displacement of the handle or control element 73 tips the cam 49 moving the pins 57 along a portion of the cam slot 53 that extends along a center of curvature at the pivot axis 49A so that the link 43 is not itself moved at all. The other pin 55, however, is moved up in the respective cam slots 51 to bring the respective planet gear 45 out of mesh with the respective output gear 59. Thus only the spindles 71 for the rear portion of the seat will be rotated.

Figure 4A:
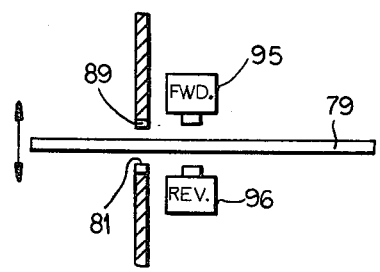
FIG. 4A is a section taken along the line IVA—IVA of FIG. 4.
Figure 4:
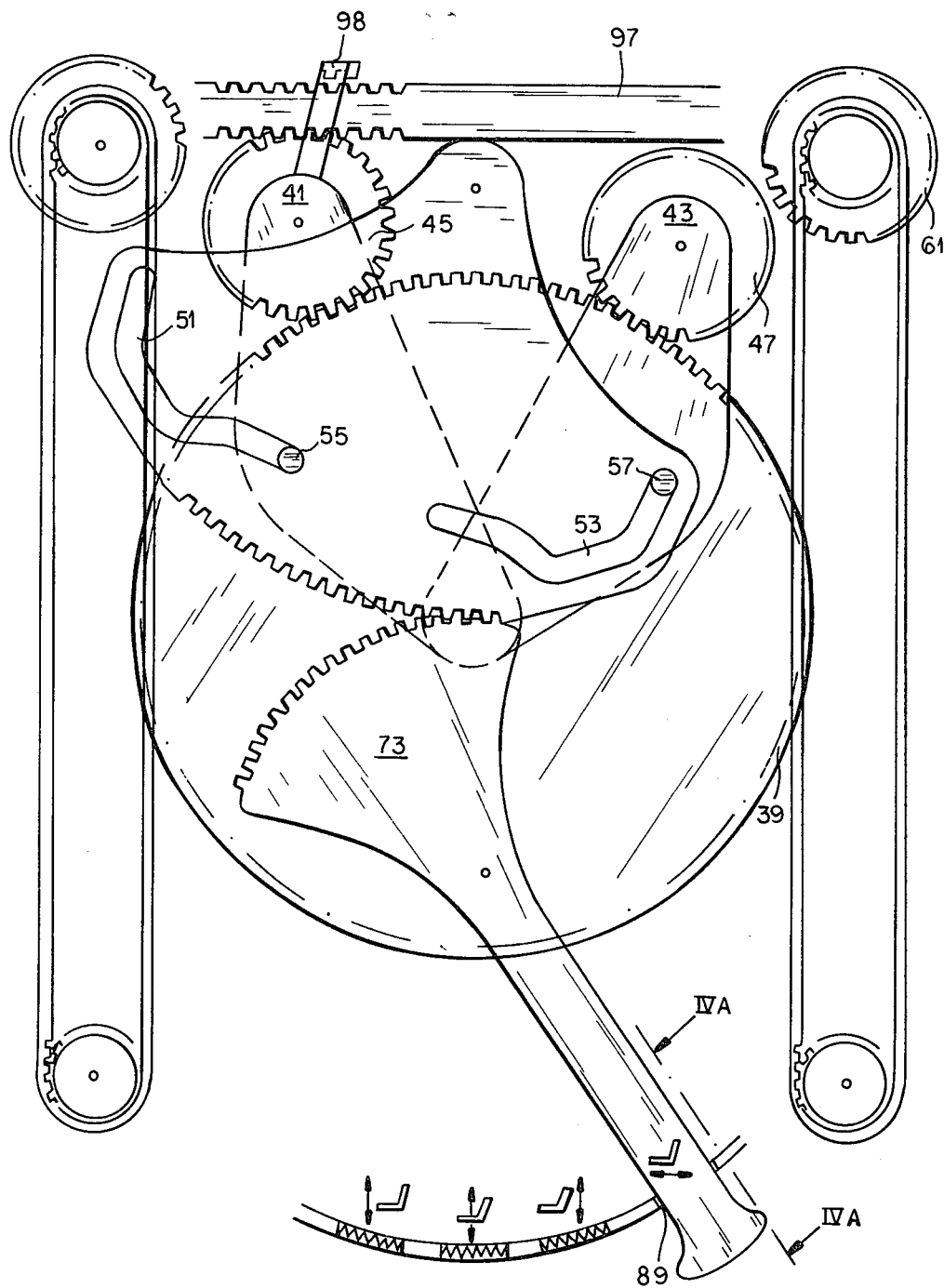

In FIG. 4 the handle 79 is shown in position 89 for horizontally displacing the motor-vehicle seat. Such displacement tips the cam 49 all the way over, bringing both of the pins 55 and 57 to the ends of their respective slots 51 and 53. The result is that the output gear 45 will be swung further up to engage the teeth of the rack 97, with the link 41 itself pushing up a blocking slide 98 that normally prevents the rack 97 from moving relative to the vehicle frame. The other link 43 is displaced upwardly sufficiently to bring this planet gear 47 out of mesh with the respective output gear 61. The rack 97 will therefore be driven in a longitudinal direction depending on the direction of rotation of the main sun gear 39.

The handle 70 can be set up with contacts such as those shown at 27, 31, 33 in FIG. 1 for operation of the respective drive motor only when the handle is in one of its positions 83, 85, 87 or 89. It is also possible as shown in FIG. 4A to provide a simple pair of switches 96 and 96 at each of the positions. The switches are double-throw switches, set up so that the switch 95 will operate the respective equivalent of the motor 23 in a forward direction and the switch 95 in the reverse direction. A single such forward switch 95 and the reverse switch 96 could be provided with an appropriate actuating member so that they can only be actuated when the handle 79 is aligned with one of the position-defining notches.

Figure 5:
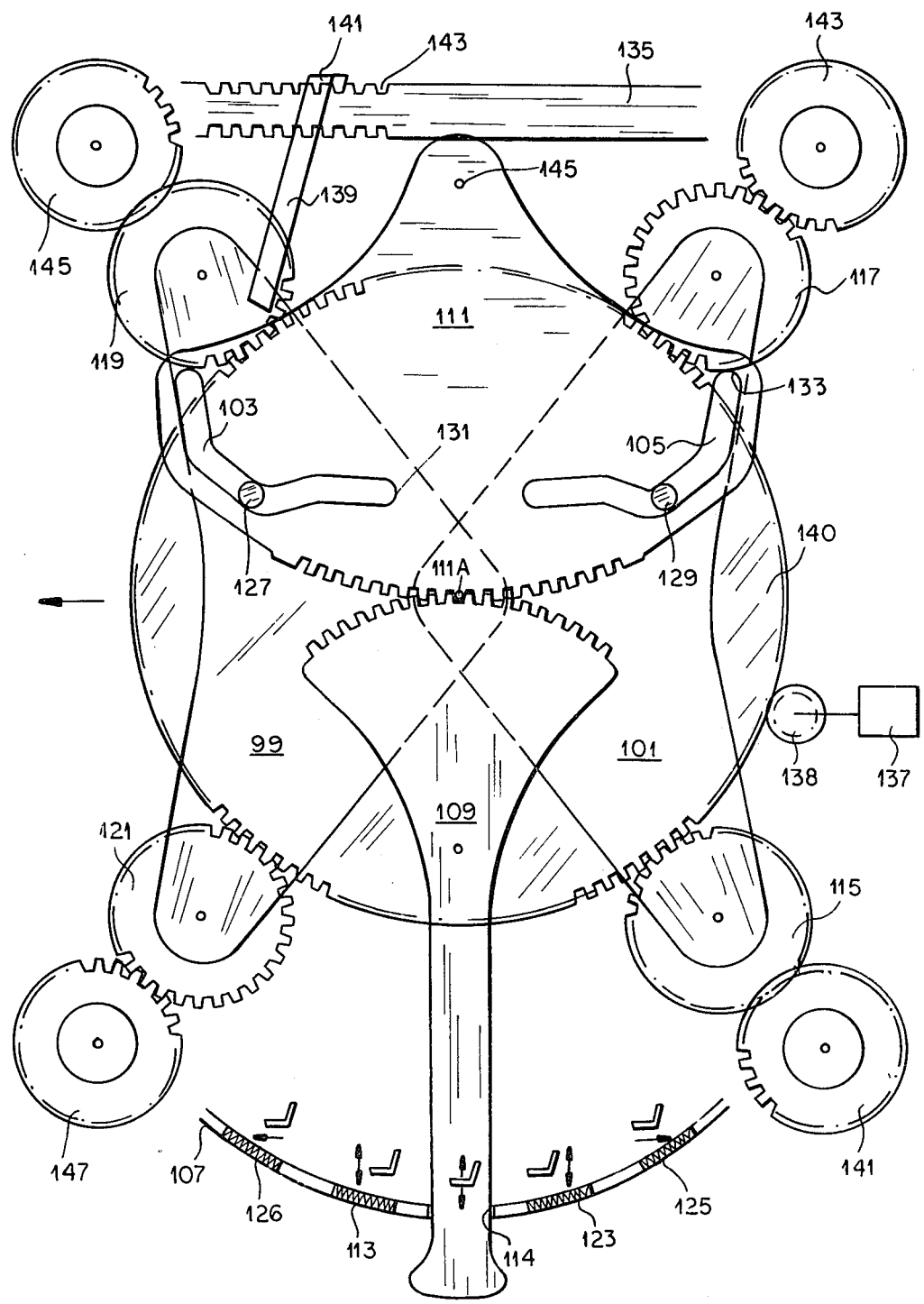
FIG. 5 is a top view of yet another seat adjuster according to this invention.

FIG. 5 shows another system wherein a reversible electric drive motor 137 carries a pinion 138 meshing with a main sun gear 111 rotatable about an axis 111A about which is pivoted a first two-arm link 99 carrying a pair of planet gears 119 and 121 and a second two-arm link 101 carrying a pair of planet gears 115 and 117. The gears 117 and 121 are diametrically opposite each other as are the gears 115 and 119. A control element 111 pivoted about an axis 145 is formed with a pair of cam slots 103 and 105 receiving respective pins 127 and 129 of the links 99 and 101, respectively. A control element 109 is displaceable in a slot 107 through positions 126, 113, 114, 123, and 125, so that this system has one more position than that of FIGS. 2–4. When the handle 109 is in position 126 the seat is moved forwardly, when in position 113 the front of the seat is moved up or down, when in position 114 the entire seat is moved up or down, when in position 123 the back of the seat is moved up or down, and when in position 125 the seat is moved backwardly. The rest of the system has the basic logic that swinging the control arm 109 fully forward will move the seat forwardly and swinging it fully back will move the seat backwardly.

When in the illustrated central position 114 all of the gears 115, 117, 119, 121 mesh with respective output gears 141, 143, 145, and 147 which are carried directly on the threaded spindles that raise and lower the motor-vehicle seat. If moved into position 126 the pins 127 and 129 will move to the blind ends 131 and 133 of the cam slots 103 and 105. This action will displace all four of the planet gears 115, 1117, 119, 121 out of engagement with the respective output gears, and will simultaneously push the planet gear 119 into mesh with a rack 135, simultaneously pushing a locking member 139 so its tooth end 141 disengages teeth 143 at this rack 135. The result will, of course, be to drive the rack 135 from the motor 137 while leaving all of the other output gears 141, 143, 145, 147 stationary. Displacement of the handle 109 into the opposite end position 125 will have the same effect. Otherwise the system operates substantially identically to that of FIGS. 2–4.

The system according to the instant invention can be made to have an extremely short vertical dimension. It can easily be made to lie flatly on the floor underneath the seat being controlled. If the gears and the links have a thickness of 6 mm and the links in their overlapping region are of half thickness, this system can be built to an overall height of 18 mm. The spindles extend upwardly into the corners of the seat, and a well is normally formed on the floor for the electric motor. Such a system can, however, easily be built into a standard seat. In fact a seat can be built which can easily be equipped with this power adjuster, or with a more conventional manual adjuster. Due to the small size of the power adjuster according to this invention no extensive differences need exist between a seat to be equipped with it or to be equipped with a standard manual adjuster.

We claim:

1. An adjuster for displacing an automotive seat relative to a vehicle frame, said adjuster comprising:
   a sun gear centered on and rotatable about a sun gear axis relative to said frame;
   a planet gear meshing with said sun gear;
   support means for displacement of said planet gear angularly of said axis while in mesh with said sun gear between a pair of angularly offset end positions;
   control means connected to said planet gear for displacing same between said end positions;
   a first output gear meshable with said planet gear in one of said end positions;
   a second output gear meshable with said planet gear in the other of said end positions;
   drive means for rotating said sun gear and thereby rotating said planet gear and driving any gear in mesh with said planet gear from said sun gear; and
   means connecting said output gears to said seat for displacement of said seat in a first direction when said first output gear is driven by said sun gear through said planet gear in said one position thereof and for displacement of said seat in a second direction different from said first direction when said second output gear is driven by said sun gear through said planet gear in said outer position thereof.

2. The adjuster defined in claim 1 wherein said support means is a rigid link having an inner end pivoted at said axis and an outer end on which said planet gear is rotatable.

3. The adjuster defined in claim 2 wherein said first output gear is a horizontally displaceable rack and said second gear is a pinion rotatable about a vertical axis.

4. The adjuster defined in claim 2 wherein said drive motor includes a reversible electric motor connected to said sun gear.

5. The adjuster defined in claim 4, further comprising switch means for preventing operation of said motor except when said planet gear is in said end positions.

6. The adjuster defined in claim 2 wherein said gears have play equal to at least one tooth spacing.

7. The adjuster defined in claim 2 wherein said first output gear is rotatable about an output-gear axis, said adjuster further comprising another output element rotatable about an axis parallel to and spaced from said output-gear axis, and a belt interconnecting said output gear and element.

8. The adjuster defined in claim 2 wherein said control means includes a pair of control elements pivoted about respective axis parallel to said sun gear axis, one of said control elements engaging said link and formed with a row of teeth centered on the respective axis and the other said control elements also being formed with a row of teeth centered on the respective axis and meshing with said teeth of said one element, and also being formed with a handle.

9. The adjuster defined in claim 2 wherein said control means includes a pivotal control element operatively connected to said link and displaceable through two positions respectively corresponding to said end positions of said planet gear, said adjuster further comprising means for retaining said element positively in its said positions.

10. The adjuster defined in claim 2 wherein said first output gear is a horizontally displaceable rack coupled to said seat, said adjuster further comprising means for preventing displacement of said rack relative to said frame except when said output gear is in said one end position.

11. The adjuster defined in claim 1 wherein said first output gear is a horizontally displaceable rack coupled to said seat and said second output gear is rotatable about an upright axis, said adjuster further comprising:
   four upright spindles supporting said seat on said frame and rotatable to vertically displace said seat relative to said frame, said second output gear being carried on one of said spindles;
   a third rotatable output gear carried on another of said spindles;
   a second such planet gear angularly offset from the first output gear; and
   a second such link between said sun gear axis and said second planet gear and connected to said control means for displacement of said second planet gear between respective end positions; and
   means for connecting each of the remaining two spindles to a respective one of the rotatable output gears.

12. The adjuster defined in claim 11 wherein said means for connecting said remaining two spindles includes two toothed belts.

13. The adjuster defined in claim 2 wherein said control means includes a cam engaging said link.

14. The adjuster defined in claim 13 wherein said cam is formed with a cam slot and said link is provided with a pin captured in said slot.

15. The adjuster defined in claim 2 wherein said first output gear is a rack and said second output gear is a rotatable pinion, said adjuster further comprising:
   a second such planet gear angularly offset from the first-mentioned planet gear.
   a second such link carrying said second planet gear and connected to said control means, for displacement between respective end positions; and
   a second such output gear meshable with said second planet gear.

16. The adjuster defined in claim 15 further comprising:
   third and fourth such planet gears carried on said first and second links, respectively, offset from said first and second planet gears;
   third and fourth such rotatable pinions meshable with said third and fourth planet gears in respective end positions thereof;
   respective first, second, third, and fourth spindles carrying said output gears and supporting said seat on said frame.

17. The adjuster defined in claim 16 wherein said control means includes a control element displaceable into
   a first position corresponding to engagement of said first planet gear with said rack and disengagement of said second through fourth planet gears from the respective output gears;
   a second position corresponding to engagement of said first through fourth planet gears with the respective output gears;
   a third position corresponding to engagement of said first and second planet gears with the respective output gears and disengagement of said third and fourth planet gears from the respective output gears; and
   a fourth position corresponding to engagement of said third and fourth planet gears with the respective output gears and disengagement of said first and second planet gears from the respective output gears, whereby said seat can be tipped on said frame in said third and fourth positions of said control element.

* * * * *